W. L. BLISS.
GENERATOR MOUNTING.
APPLICATION FILED DEC. 23, 1916. RENEWED MAY 8, 1920.

1,398,831.

Patented Nov. 29, 1921.
2 SHEETS—SHEET 2.

Witnesses
Burr H. Caldwell
Raeph Munden.

Inventor
William L. Bliss
By Raymond H. Van Nest
Attorney

UNITED STATES PATENT OFFICE.

WILLIAM L. BLISS, OF NIAGARA FALLS, NEW YORK, ASSIGNOR TO U. S. LIGHT & HEAT CORPORATION, OF NIAGARA FALLS, NEW YORK, A CORPORATION OF NEW YORK.

GENERATOR-MOUNTING.

1,398,831.   Specification of Letters Patent.   Patented Nov. 29, 1921.

Application filed December 23, 1916, Serial No. 138,612. Renewed May 8, 1920. Serial No. 379,945.

*To all whom it may concern:*

Be it known that I, WILLIAM L. BLISS, a citizen of the United States, residing at Niagara Falls, in the county of Niagara and State of New York, have invented new and useful Improvements in Generator-Mountings, of which the following is a specification.

The present invention relates to generator mountings.

In mounting the generator of a car-lighting system wherein the moving parts of the generator are driven from the car axle, it is common practice to suspend the generator from the truck which carries the car axle. It is also common practice to suspend the generator from the body of the car. The present invention relates to mountings by which the generator is suspended from the body or under-frame of the car.

In most car-lighting systems, the generator is connected to the car axle by means of a belt. It is usually desirable that the tension of said belt should be maintained substantially constant, the regulation of the output of the generator being accomplished by means independent of the belt. The present invention relates to apparatus for use in systems wherein it is desirable to maintain the belt tension substantially constant.

In mounting a car-lighting generator on the body of the car, rather than on the truck, it is necessary to provide means to compensate for the differences in the distance which may exist between the axes of the generator and the car axle under the conditions of service.

The present invention relates to means for mounting the generator whereby these differences in the distance between the generator and the car axle axes are substantially compensated for.

An object of the present invention is to provide a mounting for a car-lighting generator which will occupy a minimum of space vertically and in which, through a novel arrangement of parts the difference in the distance between the generator and axle axes may be compensated for, maintaining substantially constant belt tension.

A further object is to provide a generator mounting of the kind above referred to which will be simple in construction and involve only a small number of parts.

Further objects will be apparent as the description proceeds.

Figure 1:
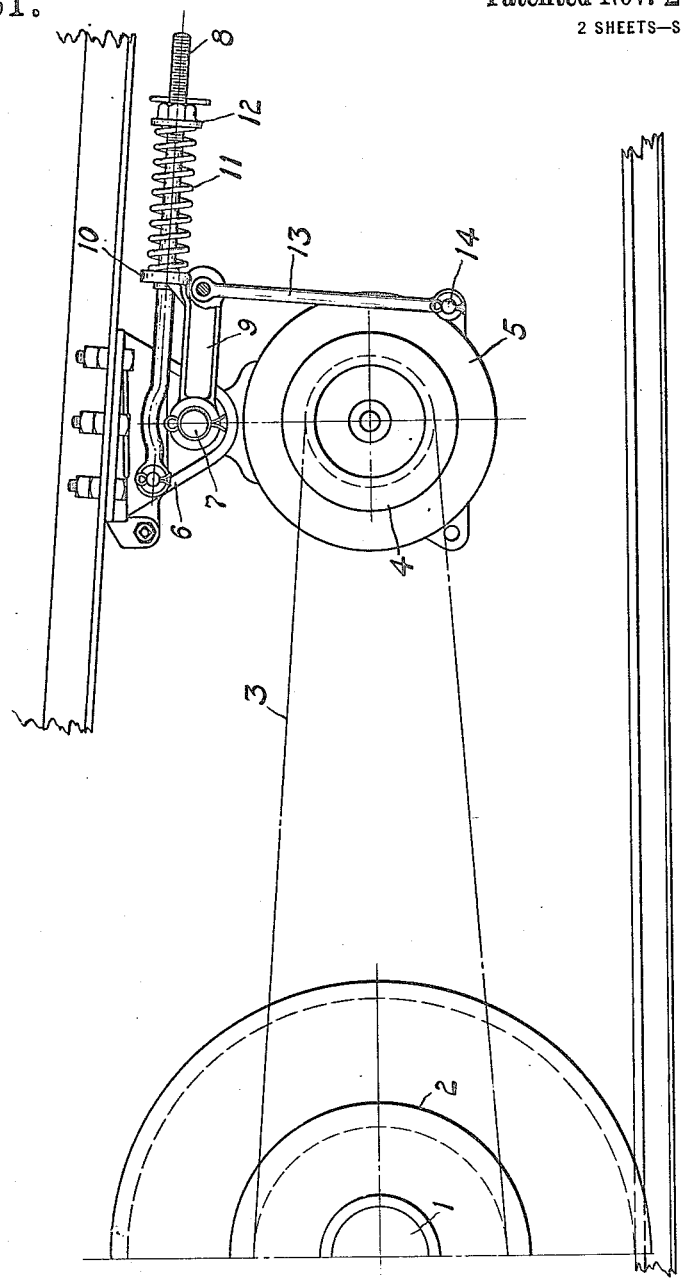

In the accompanying drawings, Figure 1 represents in elevation one embodiment of the present invention.

Figure 2:
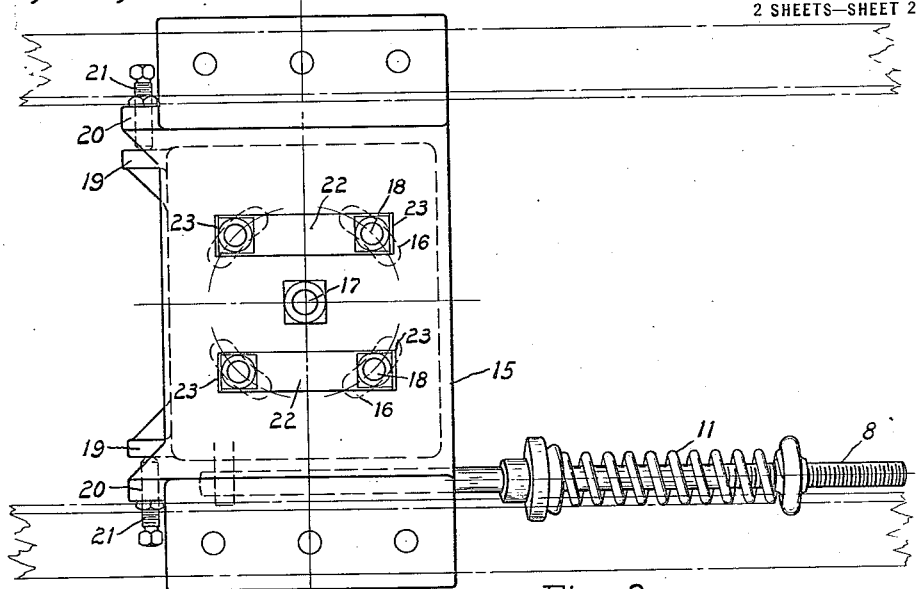
Figure 3:
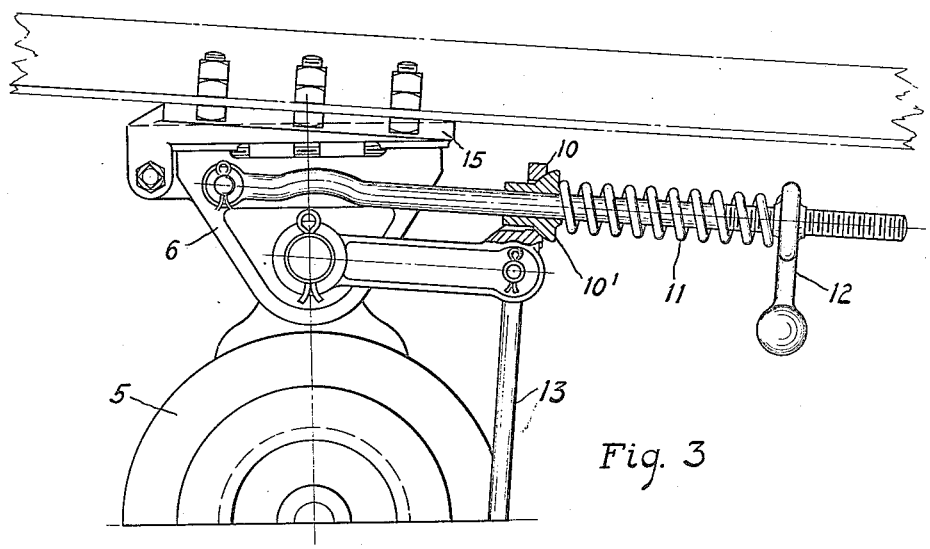

Figs. 2 and 3 represent details.

A car axle is represented by the numeral 1. Mounted on said car axle is a pulley 2. The pulley 2 is connected in driving relation, through a belt 3, with a pulley 4 mounted upon the rotor of a generator 5. The generator 5 is pivotally mounted in the manner about to be described, beneath the body portion of the car.

Suitably secured to any convenient part of the car body is a hanger 6. Said hanger 6 may be secured to the car body by bolts, or by any other suitable means. Furthermore, said hanger 6 may be provided with any preferred means for procuring angular or other adjustment to properly locate the axis of the generator 5. One such preferred means is described hereinafter. The hanger 6 is provided with a shaft 7 which may be provided with suitable bushings to permit the movement of rotation of said shaft 7. The generator 5 is pivotally supported on the hanger 6 by means of the shaft 7. Pivotally mounted on the hanger 6 at a point above and to one side of the shaft 7 is a tension rod 8. The tension rod 8 will extend across the hanger 6 above the shaft 7. Pivoted on the shaft 7 is a spring seat bracket 9. Said bracket 9 is provided with an eye portion 10 through which the tension rod 8 is adapted to extend. As shown in Fig. 3, the eye portion 10 is provided with a spring seat 10' which has a ball and socket connection with said eye portion 10. A spring 11 is positioned between the spring seat 10' and a nut 12 on the tension rod 8. The tension rod 8 will be screw-threaded for a portion of its length, whereby the position of the nut 12 may be adjusted to adjust the tension of the spring 11. Any preferred means may be used to lock the nut 12 in position, or as illustrated in Fig. 3, a gravity nut may be used. Tension lever 9 will be connected with the generator 5 by means of the tension rod 13. The tension rod will be pin connected to the generator at any convenient point 14.

A preferred means for supporting the hanger 6, whereby its angular position may be adjusted, will now be described. A hanger support 15 is provided which may be of a general wedge-shape, if desired, where the present invention is to be used on girders which are arranged at an angle to a horizontal line. The hanger will preferably be provided with a bolt hole centrally placed in its upper side. Equally spaced around said hole are four circumferentially spaced slots 16. The hanger support is provided with a centrally located bolt hole to coincide with the bolt hole in the hanger, and four circumferentially spaced bolt holes, equispaced, coinciding in radial position to the slots in the hanger 6. The centrally located holes in the hanger 6 and the hanger support 15 are adapted to receive a bolt 17, while each circumferentially located hole in the support 15 and each slot 16 in the hanger 6 are adapted to receive a bolt 18.

The upper portion of the hanger 6 is provided with a pair of outstanding shoulders 19, 19. Located on the hanger support 15 at points to embrace the shoulders 19 are lugs 20, 20. Each of said lugs 20 is provided with a screw-threaded hole to receive a set screw 21. These set screws 21, as indicated in Fig. 2, are adapted to engage the lugs 19, 19, to prevent the turning of the hanger in either direction around the bolt 17, while permitting the angular adjustment of said hanger. The slots 16 in the hanger permit the angular adjustment of said hanger and the bolts 18 aid the bolt 17 in supporting said hanger. The nut locking plates 22, 22 may be provided, mounted on the bolts 18. The ends of said plates may be turned up, as at 23, to constitute nut-locking means. The hanger support 16 may be supported from the car body by bolts or any other preferred means.

The manner in which the described embodiment of my invention accomplishes the above mentioned objects of the invention may be briefly stated as follows:—

It will be clear from the drawing that the spring 11 coöperating between the portion 10 of the spring seat bracket 9 and the nut 12 of the tension rod 8, will tend to swing the bracket 9 in a counter-clockwise direction, thereby tending to swing the generator around the shaft 7 in a counter-clockwise direction by pulling on rod 13, thus putting the belt 3 under tension. The nut 12 may be adjusted to provide the desired tension in the belt 3. It will be obvious that if the generator 5 is moved toward the axle 1, as for instance, when the train is rounding a curve, the bracket 9 will be rotated in a clock-wise direction, putting the spring 11 under an increased tension. According to the present invention, however, the increased tension of the spring 11 is compensated for, whereby the tension of the belt 3 is maintained substantially constant. This may be understood by considering that as the tension lever 9 swings in a clock-wise direction, the moment arm of the force exerted by the spring 11 will decrease. That is to say, the perpendicular drawn from the axis of the shaft 7 to the center line of the tension rod 8, will be shorter as the tension lever 9 and the tension rod 8 are swung in a clock-wise direction. Conversely, if the generator should tend to swing away from the axle 1, as when the car is rounding a curve or through stretching of the belt, the tension arm 9 and the tension rod 8 will swing in a counter clock-wise direction and the tension of the spring will be decreased. However, the decrease in the spring tension will be compensated for by the fact that the moment arm of the force expended by the spring 11 around the shaft 7 will be increased, thereby maintaining the belt tension substantially constant.

From the above description it will be evident to those skilled in the art that the present invention provides a generator mounting which will occupy a minimum of space in a vertical direction, thereby giving a maximum clearance from the generator above the tracks. A minimum of elements are used and, at the same time, a substantially constant belt tension is maintained.

One embodiment of the present invention has been described in detail. Various modifications will occur to those skilled in the art. It is intended that the patent shall cover all such modifications that fall within the scope of the invention as defined by the appended claims.

I claim:

1. In combination, a supporting member, a generator pivotally supported by said member, means connected with said generator to swing therewith, a pivotally mounted tension rod pivoted to said member, and spring means coöperating with said means and said tension rod to urge said tension rod away from the point of pivotal support of said generator.

2. In combination, a supporting means, a generator pivotally supported by said means, said generator having coöperating therewith a member constrained to swing with said generator, a pivoted rod and a spring coöperating with said member and said rod to urge said rod to a position to increase the perpendicular distance from said rod to the point of pivotal connection of said generator.

3. In combination, a supporting means, a generator pivotally supported by said means, a member constrained to swing with said generator, a pivoted rod provided with a nut and a spring encircling said rod and coöperating with said member and said nut to urge said rod away from the point of pivotal connection of said generator.

4. In combination, a pivotally mounted generator, a member attached to said generator to swing therewith and an axially movable spring constrained to swing around a relatively fixed point coöperating with said member whereby said spring tends to swing its axis away from the point of pivotal support of said generator.

5. In combination, a supporting member, a generator pivotally supported by said supporting member, a thrust member mounted to swing with said generator, a rod pivoted to said supporting member and extending through said thrust member, abutment means on said rod, and a spring coöperating with said thrust member and said abutment means.

6. In combination, a supporting member, a generator pivotally supported by said supporting member, an L-shaped thrust member having an eye in one of its sides, a rod pivoted to said supporting member and extending through said eye, said thrust member being mounted to swing with said generator, abutment means on said rod and a spring coöperating with said thrust member and said abutment means.

7. In combination, a supporting member, a generator pivotally supported by said supporting member, a thrust member mounted to swing with said generator, a rod pivoted to said supporting member and extending through said thrust member, and spring means coöperating with said thrust member and said rod to urge the axis of said rod away from the point of pivotal support of said generator.

8. In combination, a supporting member, a generator pivotally supported by said supporting member, an L-shaped thrust member having an eye in one of its sides, a rod pivoted to said supporting member and extending through said eye, said thrust member being constrained to swing with said generator, and spring means mounted on said rod for urging the axis of said rod away from the point of pivotal support of said generator.

9. In combination, a pivotally mounted generator, a belt whose tension urges said generator in one direction around the point of pivotal connection, a spring for urging said generator in the opposite direction, said spring being mounted to swing about a relatively fixed point other than the point of pivotal connection of said generator.

10. In combination, the underframe of a car, a generator pivotally mounted therebeneath, tension means extending longitudinally of the underframe, and an angle-bar mounted to move about the point of pivotal support of said generator and attached to said generator, said tension means coöperating with said angle bar to control the position of said generator.

11. In combination, the underframe of a car, a generator pivotally mounted therebeneath, tension means extending longitudinally of the underframe and mounted to move about a center which is a point other than the point of pivotal support of said generator, and an angle-bar mounted to move about the point of pivotal support of said generator and attached to said generator, said tension means coöperating with said angle-bar to control the position of said generator.

In witness whereof, I have hereunto subscribed my name.

WILLIAM L. BLISS.